United States Patent [19]

Zhang

[11] Patent Number: 5,718,878
[45] Date of Patent: Feb. 17, 1998

[54] MESOPOROUS TITANIA AND PROCESS FOR ITS PREPARATION

[75] Inventor: Zongchao Zhang, Northvale, N.J.

[73] Assignee: Akzo Nobel N.V., Arnhem, Netherlands

[21] Appl. No.: 679,029

[22] Filed: Jul. 12, 1996

[51] Int. Cl.$^6$ .......................... C01G 23/053; C01B 39/00
[52] U.S. Cl. .......................... 423/610; 423/701; 423/702; 423/705; 423/713; 106/436; 502/350; 501/134
[58] Field of Search .......................... 423/610, 701, 423/702, 705, 713; 106/436; 501/134; 502/350

[56] References Cited

U.S. PATENT DOCUMENTS

| | | | |
|---|---|---|---|
| 4,247,707 | 1/1981 | Tsutsumi et al. | 556/456 |
| 5,057,296 | 10/1991 | Beck | 423/703 |
| 5,145,816 | 9/1992 | Beck et al. | 502/60 |
| 5,149,519 | 9/1992 | Chopin et al. | 423/610 |
| 5,156,829 | 10/1992 | McCullen et al. | 423/718 |
| 5,162,283 | 11/1992 | Moini et al. | 502/350 |
| 5,177,045 | 1/1993 | Anthony et al. | 502/350 |
| 5,227,342 | 7/1993 | Anderson et al. | 501/134 |
| 5,304,363 | 4/1994 | Beck et al. | 423/328.1 |
| 5,399,535 | 3/1995 | Whitman | 501/80 |
| 5,593,655 | 1/1997 | Jongkind et al. | 423/702 |

FOREIGN PATENT DOCUMENTS

| | | |
|---|---|---|
| 655278 | 5/1995 | European Pat. Off. . |
| 2170492 | 8/1986 | United Kingdom . |

OTHER PUBLICATIONS

Corma et al., "Synthesis of an Ultralarge Pore Titanium Silicate Isomorphous to MCM–41 and Its Application as a Catalyst for the Selective Oxidation of Hydrocarbons," J. Chem. Soc., Chem Comm., pp. 147–148, 1994.

Grant et al., Grant and Hackh's Chemical Dictionary pp. 496–497, 598, 1987.

P.T. Tanev et al., "A Neutral Templating Route to Mesoporous Molecular Sieves", Science, vol. 267, Feb. 10, 1995, 865–867.

Z. Liu et al., "Relationships Between Microstructure and Surface Acidity of Ti–Si Mixed Oxide Catalysts", Journal of Catalysis 149, 117–126 (1994).

Chemical Abstracts, vol. 111, 236067p (1989)(No Month).
J.R. Sohn et al., "Characterization of $TiO_2$–$SiO_2$ Modified With $H_2SO_4$ and Activity for Acid Catalysis", Journal of Catalysis 136, 267–270 (1992) (No Month).

"Titanium Compounds (Inorganic)", Kirk–Othmer Encyclopedia of Chemical Technology, Third Edition, vol. 23, 139–143 and 172–173.(No Month)(No Author)(1983).

Derwent Patent Abstract 80–33528c/19 (1986)(No Month).
G. Dagan et al., "Preparation and Characterization of $TiO_2$ Aerogels for Use as Photocatalysts", Journal of Non–Crystalline Solids 175 (1994) 294–302.(No Month).

Q. Huo et al., "Organization of Organic Molecules with Inorganic Molecular Species into Nanocomposite Biphase Arrays", Chem. Mater. 1994, 6, 1176–1991.(No Month.

G. Dagan et al., "$TiO_2$ Aerogels for Photocatalytic Decontamination of Aquatic Environments", The Journal of Physical Chemistry, vol. 97, No. 49, Dec. 3, 1993, 12651–12655.

Derwent Patent Abstract 83–811922/45 (1983) (No Month).
S. Sarrade et al., "Dynamic Characterization and Transport Mechanisms of Two Inorganic Membranes for Nanofiltration", Journal of Membrane Science 97 (1994) 155–166. (No Month).

J.F. Quinson et al., "Correlation Between the Preparation Conditions and the Mesoporous Texture of Titania Gels", Journal of Non–Crystalline Solids 121 (1990) 72–75. (No Month).

D.M. Antonelli et al., "Synthesis of Hexagonally Packed Mesoporous $TiO_2$ by a Modified Sol–Gel Method", Angew. Chem. Int. Ed. Engl. 1995, 34, No. 18, 2014–2017. (No Month).

P.T. Tanev et al., "Titanium–Containing Mesoporous Molecular Sieves for Catalytic Oxidation of Aromatic Compounds", Nature, vol. 368, Mar. 24, 1994, 321–323.

*Primary Examiner*—Mark L. Bell
*Assistant Examiner*—Louis M. Troilo
*Attorney, Agent, or Firm*—Richard P. Fennelly; Louis A. Morris

[57] ABSTRACT

Essentially mesoporous titanium oxide materials, having an average pore diameter of no more than about 100 Å (e.g., from about 20 Å to about 50 Å) and an average surface area of no less than about 300 $m^2/gm$, preferably no less than about 500 $m^2/gm$ are disclosed which optionally can contain an effective amount of at least one transition metal (e.g., a rare earth metal, iron, or the like) for stabilization. These materials can be formed by treating a titanium source, which is derived from a titanium alkoxide, in an organic-aqueous solution, with an organic structure directing agent (e.g., higher alkyl amine, optionally in the presence of an alcohol cosolvent) to form meso-sized micelles and hydrothermally treating the resulting composition.

7 Claims, No Drawings

5,718,878

MESOPOROUS TITANIA AND PROCESS FOR ITS PREPARATION

BACKGROUND OF THE INVENTION

Recently, various disclosures have appeared in the prior art concerning the synthesis of various mesoporous metal oxide materials.

Activated aluminas, which form only one example of metal oxide materials that have investigated, are, in general, attractive catalysts for processes such as petroleum hydrodesulfurization, isomerization reactions, the Claus reaction, the dehydrogenation of butane to give butenes and the dehydration of alcohols to give alkenes. One of the major problems related to the use of alumina catalysts is the deactivation by coke formation and pore plugging which limits the diffusion of substrates and products in and out the catalyst particles. It is known that the larger the contribution of micropores to the specific surface area and the wider the pore size distribution, the greater the enhancement in the deactivation rate. Thus, synthesis of aluminas with porosity properties comparable to those exhibited by high and all-silica mesoporous materials has been characterized as being of industrial interest.

The silica-based mesoporous materials developed by researchers at Mobil, e.g., M41S, were recently prepared by organizing silica with organic surfactants (See C. T. Kresge et al., Nature 1992, 359, 710–712 and J. S. Beck et al., J. Am. Chem. Soc. 1992, 114, 10834–10843). These materials can exhibit cubic or hexagonal symmetry, e.g., MCM-48 and MCM-41, respectively. Thermal decomposition of the surfactant allowed for the development of narrow pore size distributions in the general range of 15–100 Å and BET specific surface areas above 1000 m²/g.

It is also known to synthesize mesoporous crystalline materials containing such oxide materials as silica and alumina (see, for example, U.S. Pat. Nos. 5,057,296 to J. S. Beck and 5,198,203 to C. T. Kresge et al.) More recently, layered, nonporous aluminas have been synthesized using anionic surfactants (see, for example, Nature, Vol. 368, Mar. 24, 1994, pp. 317–321 and Chemistry of Materials, 1994, Vol. 6, pp. 1176–1191).

In addition to the foregoing prior art disclosures, certain other disclosures exist in the art showing alumina-containing, relatively large macroporous structures with an average pore diameter of over 100 Å. Examples such disclosures may be found, for example, in European Patent Publication Nos. 363,910 and 365,801.

Recently, the synthesis of all-alumina mesoporous materials has been mentioned by S. A. Bagshaw et al, Science, Vol. 269, Sep. 1, 1995, pp. 1242–1244. The procedure, which is not given in detail in that publication, involves the use of polyglycols as surfactants. The solids after calcination at 873 K can develop a material having a BET specific surface area of 420 m²/g and a pore diameter of 48 Å.

Mesoporous materials are not restricted to those containing silica and/or alumina, however, since MCM-41 type materials have been reported recently for antimony, and lead (See Q.Huo et al., Nature 1994, 368, 317–321 and Q.Huo et al., Science 1995, 269, 1242–1244), as well as titania (D. M. Antonelli et al. in Angew. Chem. Int. Ed. Eng. 1995, 34, No. 18, 2014–2017). This lattermost disclosure is deemed to be especially pertinent to the present invention, and it indicates that such mesoporous titania materials have the following characteristics: (1) they are essentially pure titania; (2) they have a surface area of about 200 m²/g; and (3) they are formed by using a tetraalkylphosphate as a templating agent.

SUMMARY OF THE INVENTION

An objective of the present invention is to synthesize novel mesoporous titania-containing materials, having an average pore diameter of no more than about 100 Å, with high surface areas of over 300 m²/g, such as those also containing an effective amount of at least one transition metal for structural stabilization and improved catalytic performance. These materials can be formed by treating a titanium source, which is derived from a titanium alkoxide, in an organic-aqueous solution, with an organic structure directing agent, such as a higher alkyl amine (e.g., containing from about six to about eighteen carbon atoms in its alkyl group), optionally in the presence of an alcohol cosolvent (e.g., containing from about two to nine carbon atoms) to form meso-sized micelles and hydrothermally treating the resulting composition.

DESCRIPTION OF THE PREFERRED EMBODIMENTS

The present invention, therefore relates to a novel mesoporous titania materials, having an average pore diameter of no more than about 100 Å (e.g., an average pore diameter of from about 20 Å to about 50 Å), with high surface areas of over 300 m²/g, preferably an average surface area of no less than about 500 m²/gm.

The process for forming these mesoporous titania compositions, which in one embodiment can be substantially pure in titania, is generally similar to the templating technique used to form molecular sieves (silicoaluminates), such as the well known MCM-41 material, with the exception that a lower temperature is used and a primary amine is used as the templating agent rather than a quaternary ammonium compound. In general terms, the present process comprises treating an titanium source, which can, for example, be derived from titanium alkoxide, in an organic (e.g., alcohol) or organic-aqueous solution maintained at from about 0° C. to about 30° C. (preferably at about 0° C.) for about twenty-four hours, with an appropriate organic structure directing agent (e.g., an alkyl primary amine, such as a fatty alkyl primary amine, such as hexadecylamine, at a molar ratio of 0.2 to 0.8 to titanium) for forming the desired meso-sized micelles of the foregoing pore size ranges, and then hydrothermally treating the resulting composition (e.g., at from about 80° C. to about 120° C. for from about six to about forty-eight hours) so that the mesoporosity is maintained in that general range. During the micelle formation step, the titania that is formed bonds to the amine filling in the micelle's voids. The template is then removed by heating to about 350° C. to oxidize the template or by extraction in an acidic pH range with an organic-aqueous solvent, such as ethanol-water. The acidity of the extraction solvent can be adjusted as needed with any mineral acid such as hydrochloric acid, nitric acid, or sulfuric acid.

If desired, the reaction mixture used to form the titanium product can contain an effective amount of at least one transition metal (including the rare earth metals) for structural stabilization. One representative transition metal which can be selected is iron. The metal or metals can be introduced as ionic precursors during extraction or post extraction. It can, for example, be accomplished by adding titania materials, prepared according to the above procedure, to a solution of the metal salts under stirring. The metal to titania weight ratio can reach 0.5. The metal-containing mesoporous materials that result have better thermal stability under calcination at higher temperatures.

In accordance with the broadest articulation of the present invention, various anionic surfactants, polar or apolar solvent, and titanium alkoxides can be used to form the desired titania mesophases. The organic structure directing agent can, for example, be a higher alkyl amine containing from about six to about eighteen carbon atoms in its alkyl group. If desired, an alcohol cosolvent containing from about two to nine carbon atoms can also be used to assist in the solubilization of the amine templating agent. The following Examples further illustrate the invention.

EXAMPLE 1

This Example illustrates the synthesis of hydrophobic $TiO_2$ using an aliphatic amine as templating agent.

First, 1-hexadecylamine (HDA), 65 grams, was dissolved in 418 grams of ethanol. To the ethanol solution, 532 grams of distilled water was added under agitation and 250 grams of tetraethoxytitanium was then slowly added to the solution while agitation was maintained. After aging for twenty-four hours, the slurry was filtered. The solid material was dried in air at ambient temperature. A total of 150 grams of solid material containing $TiO_2$ was obtained. The final weight corresponded to the total of $TiO_2$ and HDA used. Extraction of HDA from 1 gram of the material with 150 ml of hot ethanol was tested. There was no weight loss after the extraction. The extraction was repeated three times with 400 ml ethanol, each at 50° C. Again, no weight loss was found.

This hydrophobic $TiO_2$ was thermally treated in air at 150° C. The treated material had a surface area of 4 $m^2/g$ as the mesopores were still filled by HDA. The untreated hydrophobic $TiO_2$ can serve as an intermediate for the preparation of high surface area $TiO_2$.

EXAMPLES 2–4

These Examples further illustrate the hydrophobic properties of the material from Example 1.

In a glass beaker with a small amount of the $TiO_2$ containing material, distilled water was added dropwise. The water drops were repelled away from the material. When more water was added, the material floated over water.

To a 50 ml beaker with 20 ml water, 0.5 gram of hexane was added. As hexane and water do not mix, hexane layer was on top of water. One gram of hydrophobic $TiO_2$ was subsequently added to the beaker. It absorbed all the hexane and became cake-like on top of the water. It was separated from water by filtration.

To a 50 ml beaker with 20 ml water, 0.5 gram of carbon tetrachloride was added. As carbon tetrachloride and water do not mix, carbon tetrachloride layer which is heavier than water sat at the bottom of water. 1 gram of hydrophobic $TiO_2$ was subsequently added to the beaker. After stirring, it absorbed all $CCl_4$ and became cake-like on top of water.

EXAMPLE 5

Five grams of the hydrophobic $TiO_2$ synthesized according to Example 1 was added to a solution of ethanol (200 ml) and water (150 ml). Under agitation, the pH of the slurry was maintained at 2 by adjustment with HCl. After stirring for two hours, the slurry was filtered. The $TiO^2$ was dried at room temperature. This treatment procedure was repeated once. The pore surface area of the $TiO_2$ thus prepared was 615 $m^2/g$ and the pore diameter was 20 Å. No C—H band was detected from the final material by infrared, indicating that the organic template was completely removed. The framework $TiO^2$ showed a different structure from anatase and rutile.

EXAMPLE 6

A sample of the product from Example 5 was thermally treated in air at 350° C. overnight. The pore surface area of the resulting thermally treated product was 467 $m^2/g$, and its pore size was 17 Å.

EXAMPLE 7

Five gram of hydrophobic $TiO_2$ from Example 1 was added to a solution of $H_2O$ (150 ml) and ethanol (200 ml) containing 5 g of dissolved ammonium chloride. The slurry was stirred overnight, and it was dried in air at room temperature after filtration. The same procedure was repeated with 2 g of ammonium chloride. This treatment resulted in a $TiO_2$ with surface area of 302 $m^2/g$ and pore size of 19 Å.

EXAMPLE 8

Five gram of hydrophobic $TiO_2$ from Example 1 was added to a solution of $H_2O$ (150 ml) and ethanol (200 ml) containing 5 g of dissolved ammonium nitrate. The slurry was stirred overnight, and it was dried in air at room temperature after filtration. The same procedure was repeated with 5 g of ammonium nitrate. This treatment resulted in a $TiO^2$ with surface area of 402 $m^2/g$ and pore size of 18 Å.

EXAMPLE 9

Five gram of hydrophobic $TiO_2$ from Example 1 was added to 400 ml of ethanol. The pH was adjusted to 2 with diluted HCl solution. The slurry was stirred for over two hours. It was then subsequently filtered and dried in air at room temperature.

The same procedure was repeated with another 150 ml ethanol. This treatment resulted in a $TiO_2$ with surface area of 592 $m^2/g$ and pore size of 20 Å.

EXAMPLE 10

A clear, 1.0M solution was made by dissolving 30 g (0.12225 mol) dodecylamine acetic acid salt (DDA-OAc) in 132.25 mL water with heating and stirring. The solution was subsequently chilled to approximately 0° C. in an ice/water bath. 55.78 g (0.2445 mol) of Titanium (IV) ethoxide (TEOT) was added slowly to the stirring solution. The mixture was aged for six days at 0° C. with stirring. The precipitated Titania was then filtered and dried over vacuum. The dry powder was stirred into 350 mL of water and acidified with dilute HCl to pH 3. 300 mL of ethanol (EtOH) was added to promote the extraction and the pH increased to 4. The pH of the solution was again adjusted to 3 with dilute HCl. Finally the product was filtered and washed first with 800 mL of EtOH/water at pH 3, and then 600 mL of water. The powder was dried on vacuum at room temperature. The pore surface area of the dried material was 562 $m^2/g$ and the pore diameter was 21 Å.

EXAMPLE 11

In this Example, 13.2 g (0.055 mol) hexadecylamine (HDA) was dissolved in 83 g (1.80 mol) EtOH to make a clear solution. In a separate beaker, 305.0 g (5.07 mol) of ethylenediamine (EDA) was dissolved in 14.4 g (0.80 mol) water. The two solutions were then combined, which resulted in a slight exotherm. After cooling over-night, the solution solidified into a white solid. The solid was warmed again, a clear liquid was once again obtained. 45 g (0.20 mol) TEOT was added slowly to the solution while stirring slowly. After aging for a week, the precipitated titania was filtered and dried. The acid-ethanol-water extraction was performed several times with different proportions of water and EtOH. The final extraction was done on 2.0 g of product stirred into 150 mL of water. The mixture was acidified to pH 4 with dilute HCl and allowed to stir for 4 hours. 200 mL EtOH was added and then the product was filtered. The powder was washed twice with EtOH/water at pH 3, then with large amounts of water, and then left on the vacuum over-night to dry. Finally, the product was placed in the hood and air dried for two days. The pore surface area for this material was 517 $m^2/g$ and pore diameter was 26 Å.

EXAMPLE 12

In this Example, 25 g (0.135 mol) of DDA was dissolved in 104 g (2.26 mol) of EtOH. 133 g (7.4 mol) of water was then added to the solution. The solution was cooled to approximately 0° C. and stirred while 57.1 g (0.25 mol) of TEOT was slowly added. The mixture was aged for one week at 0° C. with slow stirring. The titania was then filtered to give a yellowish powder. The powder was then stirred into 200 mL of water, acidified to pH 4 with dilute HCl and left to sit over-night. The extraction was repeated several times, each time with increasing volume of EtOH in the original extraction solution. The material had a pore surface area of 564 $m^2/g$ and pore diameter of 23 Å.

EXAMPLE 13

A clear solution was made by dissolving 25.039 g (0.135 mol) of DDA was dissolved in 105.1 g (2.28 mol) EtOH, then 133.4 g (7.4 mol) of water was added. The solution was cooled to approximately 0° C. and 71.07 g (0.25 mol) Titanium (IV) isopropoxide (TPOT) was slowly added while stirring. The solution was aged at 0° C. with stirring for one week. The titania was then filtered, washed with water, and dried in the hood. The powder was extracted once with the acid extraction method and then dried. The finally material had a pore surface area of 424 m2/g and pore diameter of 24 Å.

EXAMPLE 14

Thirteen grams of the templated titania which was prepared according to Example 12 (prior to extraction of the template) was added to a liquid comprising 150 ml of water and 200 ml of ethanol. Under stirring, 18 g of ferric chloride was then added. The resulting slurry was filtered after twenty-four hours and was washed with distilled water. After drying at 200° C., a mesoporous Fe/$TiO_2$ product was found to have a pore surface of about 820 $m^2/g$ and a pore diameter of 20 Å. Drying of this material at 350° C. yielded a final product having a surface area of 375 $m^2/g$ and a pore diameter of 35 Å.

The foregoing Examples, since they only illustrate certain embodiments of the present invention, should not be used to construed the present invention in a limiting sense. The scope of protection sought is given in the claims which follow.

I claim:

1. A process for forming a substantially pure mesoporous, titaniumoxide-containing composition having a pore diameter of no more than about 100 Å and a surface area of no less than about 300 $m^2/gm$, which comprises treating a titanium source which is derived from a titanium alkoxide, in an organic-aqueous solution, with a higher alkyl amine directing agent to form meso-sized micelles and hydrothermally treating the resulting composition.

2. A process as claimed in claim 1 wherein the organic structure directing agent is a higher alkyl amine and the solution also contains an alcohol cosolvent.

3. A process as claimed in claim 2 wherein the a higher alkyl amine contains from about six to about eighteen carbon atoms in its alkyl group.

4. A process as claimed in claim 2 wherein the a higher alkyl amine contains from about six to about eighteen carbon atoms in its alkyl group and the alcohol cosolvent contains from about two to nine carbon atoms.

5. A process as claimed in claim 1 wherein the template is removed and a transition metal is exchanged into the titanium oxide-containing composition.

6. A process as claimed in claim 5 wherein the transition metal is iron.

7. A process as claimed in claim 5 wherein the transition metal is a rare earth metal.

* * * * *